E. H. WHITE

Oct. 18, 1932.

Re. 18,626

METHOD OF AND APPARATUS FOR MANUFACTURING CEMENTITIOUS ARTICLES

Original Filed May 20, 1926 2 Sheets-Sheet 1

Edwin H. White Inventor

By His Attorney

Edmund G. Porden

Oct. 18, 1932. E. H. WHITE Re. 18,626
METHOD OF AND APPARATUS FOR MANUFACTURING CEMENTITIOUS ARTICLES
Original Filed May 20, 1926 2 Sheets-Sheet 2
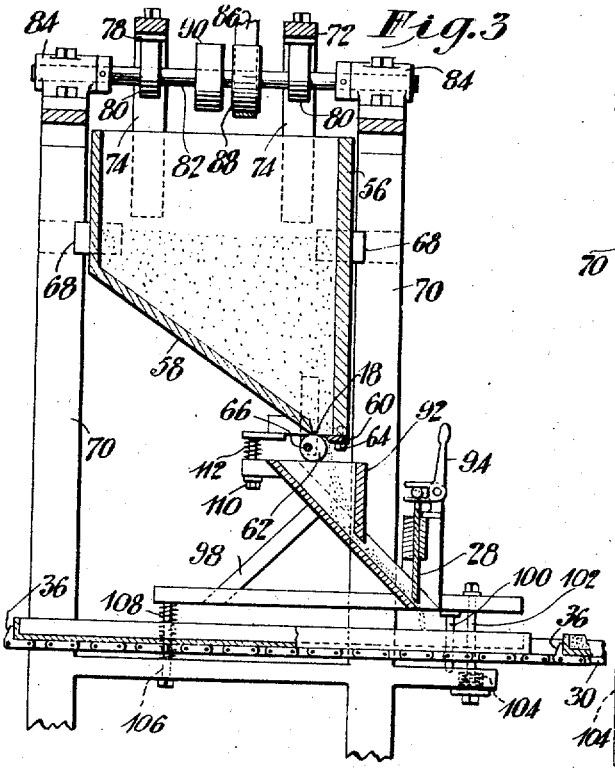
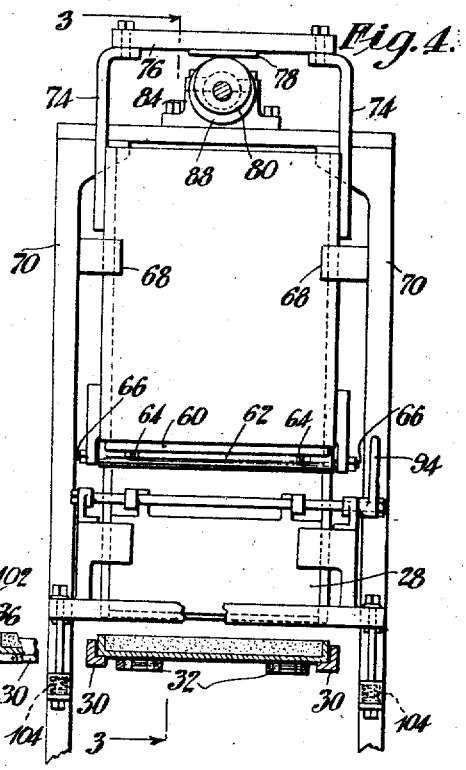
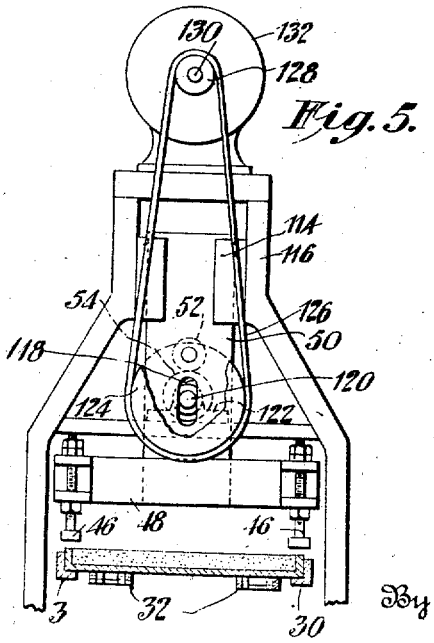
Edwin H. White Inventor
By His Attorney
Edmund C. Boden Reissued Oct. 18, 1932

Re. 18,626

UNITED STATES PATENT OFFICE

EDWIN H. WHITE, OF NEWARK, NEW JERSEY, ASSIGNOR TO DECORATIVE TILE CORPORATION, OF ESSEX COUNTY, NEW JERSEY, A CORPORATION OF NEW YORK

METHOD OF AND APPARATUS FOR MANUFACTURING CEMENTITIOUS ARTICLES

Original application filed May 20, 1926, Serial No. 110,343. Renewed November 30, 1928. Original No. 1,727,580, dated September 10, 1929. Application for reissue filed September 9, 1931. Serial No. 561,971.

This invention relates to the manufacture of tiles and more particularly to a method of and an apparatus for manufacturing multi-colored decorative tiles. Tiles are quite extensively used in the building trades for many purposes. A great majority of all tiles now being used are ceramic in nature, which are finished and hardened by firing or burning. Burned tiles are expensive and often deteriorates with age. Further, there are many limitations upon the character and colors of tiles which may be made by firing.

The primary object of the present invention is to provide a method by which tiles of excellent quality and hardness and great beauty may be made with naturally hardening cementitious materials.

Another object of the invention is to provide a method by which tiles may be made very hard and heat proof and provide tile surfaces which will not check or readily deteriorate with age.

A further object of the invention is to provide a method of and apparatus for making multi-colored decorative tiles of uniform quality and pleasing color effects.

The present method and apparatus is of general application to the molding of cementitious materials of all kinds and may be utilized for making cement for concrete articles or structures of all kinds or for placing such materials in any desired situation.

Another object of the invention is the provision of an improved method of forming, molding or placing concrete whereby a superior product results in the matter of solidity, density, elimination of voids or honeycomb, better bonding between concrete and other elements and increased strength of the finished product.

Another object is the provision of a method of manufacturing concrete which results in a very substantial saving in cement and at the same time results in a product of high quality having substantially better characteristics than the concrete of the prior art.

Another object of the invention is the provision of an improved method of molding, placing or treating the concrete which requires a minimum amount of labor and which may be carried out at a minimum cost.

Another object is the provision of an improved method of molding concrete by means of which various mixtures of aggregates, cement and water may be placed within a mold and reduced to a flowing condition within the mold without the necessity for using excess water.

Another object is the provision of an improved apparatus which is well adapted for use in the practice of my improved methods. The apparatus selected to illustrate the invention is merely exemplary of one form of apparatus adapted to be used in carrying out the method.

With these and other objects in view the invention consists in the method of an apparatus for making decorative tiles hereinafter described and particularly defined in the claims.

The various features of the invention are illustrated in the accompanying drawings, in which:

Fig. 3 is a vertical sectional view of a feed hopper of the apparatus taken on the line 3—3 of Fig. 4;

Fig. 4 is the front elevation of the feed hopper; and

Fig. 5 is a side elevation of one of the vibrators used in the apparatus.

Figure 1:
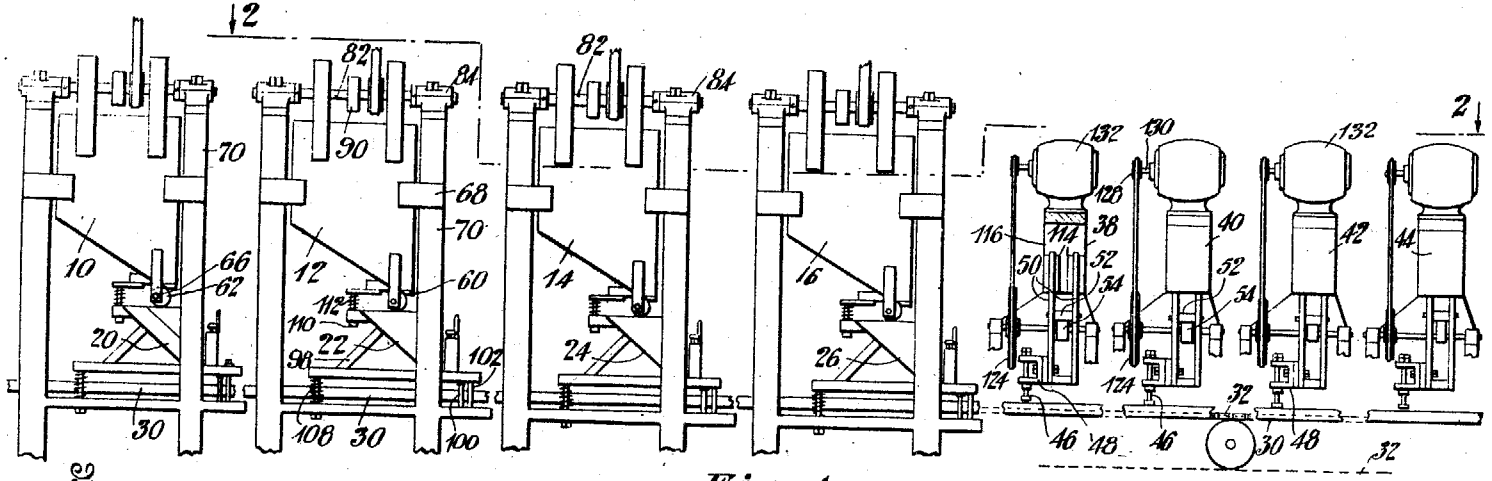
Fig. 1 is a view in side elevation with parts broken away of an apparatus in which the method of making decorative tiles in accordance with the preferred form of the invention may be carried out.
Figure 2:
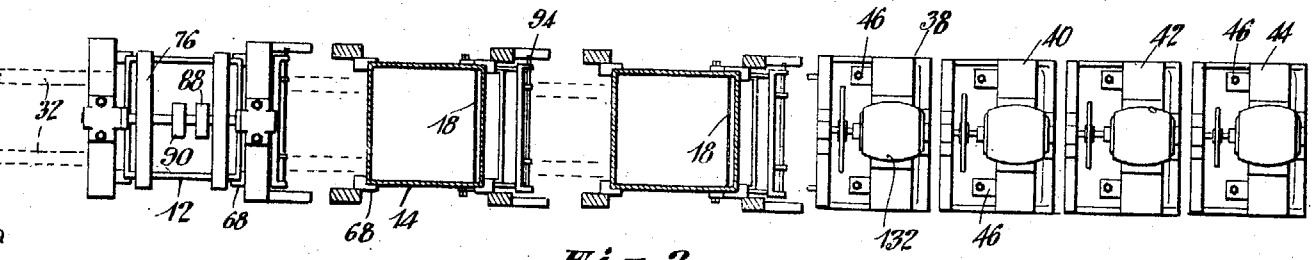
Fig. 2 is a plan view of the apparatus shown in Fig. 1 and taken on the line 2—2 of Fig. 1.

The apparatus shown in the drawings is designed primarily for carrying on a continuous manufacture of tiles while developing any desired multi-colored effect of a substantially uniform nature. The preferred method of making tiles with the apparatus shown in the drawings consists in passing forms under feed hoppers and depositing in the forms layers of plastic materials, each layer consisting of one of the characteristic colors used in securing the color effect of the finished tile. After the desired number of layers have been built up in the forms they are conveyed beneath vibrating apparatus, and a series of different vibrations are imparted to the forms to compact the cementitious material in the form and to carry the colors of the different cement through the various layers to bring out various color designs on the faces of the tiles which are at the bottoms of the forms. The vibrations are carried on in successive stages, the first stage being comparatively slow rate of vibration, the next stage having a higher rate of vibration, and the last stage imparting the highest rate of vibration. The plastic cementitious materials in the layers are forced through one another while in a plastic state and after the form has been sufficiently vibrated to develop the desired color effect, the form is deposited in a curing room and the tile allowed to harden to give the finished product.

The above described method may be carried out in the apparatus illustrated in the drawings as follows:

A cementitious material each with a different color is supplied to feed hoppers 10, 12, 14, and 16. The cement passes through a slot 18 at the bottom of each hopper to feed aprons 20, 22, 24 and 26. The cement is uniformly distributed over the aprons 20 to 26 by vibration and flows under a doctor 28 where the thickness of the layer may be carefully gauged to deposit any desired thickness of cement in the form. The form for receiving the cement illustrated in Fig. 3 consists of a flat open top box which moves on guide rails 30 which are in the form of angle irons and spaced apart a distance substantially equal to the width of the form. The forms are carried along the guide rails 30 by means of conveyor chains 32, Fig. 4, which are provided with upstanding lugs 36 arranged to engage the rear edge of the form. As the form passes under the hopper the doctor 28 is lifted and a stream of cement is deposited in a layer in the form. The apron has a width substantially equal to the width of the form and therefore the cementitious layer is deposited in a substantially uniform layer in the form. As shown in the drawings the doctor 28 is arranged to be manually operated to feed the cementitious material to the form while it is passing thereunder, but automatic means may be used which may be operated by the form to open and close the doctor in depositing the layer in the form. As the form passes along under the succeeding hoppers, successive layers of materials are built up in the form and the loaded form then passes under a series of vibrators 38, 40, 42 and 44.

The vibrators consist of hammers 46, Fig. 5, which are arranged to engage opposite edges of the form. The hammers 46 are carried on a head 48 which in turn is movably mounted in a frame 50. In the frame 50 is mounted a roller 52 which is arranged to engage a cam 54 and a rotation of the cam imparts a vibration to the frame. The hammers 46 permit the form to move thereunder and impart a continuous vibration to the form as it advances. The vibrator 38 has the lowest speed of vibration and vibrators 40, 42 and 44 have successively increasing rates of vibration. After the forms pass under the vibrator 44 they are removed from the guide rails and sent to a conditioning room to harden.

The cement hoppers have all substantially the same construction and mode of operation and are illustrated in detail in Figs. 3 and 4. Each hopper consists of a box-like structure 56 having a downwardly inclined bottom 58. The bottom feed spout 18 is provided with a rod 60 and a gate 62. The rod 60 is adjustable on the set screws 64 to assist in providing a slot of any desired opening. The gate 62 has the form of a roller which is eccentrically mounted on pins 66 located on each end of the roll. The pins 66 are arranged to clamp the gate in any desired position and the eccentric mounting of the gate permits an adjustment of the opening of the slot 18. The hopper 56 is arranged to move between guides 68 secured to a framework 70, the hopper being supported by hangers 72. The hangers 72 are shown more particularly in Fig. 4 and consist of arms 74 which are attached to the sides of the hopper and cross bars 76 connecting the arms. A wear plate 78 is mounted upon the bottom of each of the bars 76 and is arranged to engage eccentrics 80 which are fixed on a drive shaft 82. The drive shaft is rotatably mounted in journals 84 mounted on the frame 70 and rotary motion is imparted to the cams 80 by means of a belt 86 which runs over a fixed pulley 88. A lose pulley 90 is mounted adjacent the fixed pulleys 88 by which the belt may be moved into an idler position when the hoppers are not in use. The eccentric mounting of the hopper on the eccentric 80 imparts a vibration to the hoppers which tends to mix and move the plastic cement downwardly through the hopper and through the fed slot 18.

The feed aprons 20, 22, 24 and 26 have all the same construction and mode of operation and are illustrated in detail in Figs. 3 and 4. Each apron is mounted directly below the hopper 56 and is preferably made with a delivery edge of substantially the width of the tile form. The cementitious material issuing from the feed slot 18 is deposited on the upper end of the apron behind a dam 92. The cement moves through on opening between the bottom of the dam 92 and the apron downwardly across the apron and into engagement with the doctor 28. The doctor 28 is arranged to be moved toward and from the apron by means of a bell crank lever 94. The apron is mounted on a framework 98 which is arranged to have a pivotal mounting around pins 100. The front end of the frame 98 is yieldably held against the pins 100 by means of a bolt 102 and a spring 104. The back end of the frame 98 is yieldingly mounted in a frame 70 by means of a bolt 106 and a spring 108. A yieldable connection is made between the upper part of the apron frame and the bottom of the hopper consisting of a bolt 110 and a spring 112. The vibration imparted to the hopper is imparted through the spring 112 to the apron frame and the mounting of the frame tends to give a vibration to the apron that will distribute and feed the cement over the face of the apron. The adjustment of the doctor with reference to the apron will determine the thickness of the layer of cement which runs over the apron under the form.

The apparatus for imparting vibration to the tile forms is illustrated more particularly in Figs. 1 and 5. Each vibrator has substantially the same construction and the different speed of vibration of each of the vibrators 38 and 44 inclusive is obtained preferably by using electric motors having different rates of rotation. It is obvious that the rates of vibration may be varied by different size of gearing connections between the driving motor and the eccentric which imparts vibration to the vibrating hammers. Referring to Fig. 5, the hammers 46 are adjustably mounted on the head 48 by means of a series of lock nuts so that the normal spacing of the hammers from the top to the form may be varied. The frame 50 which carries the head 48 is slidably mounted in a guide 114 in a framework 116. Slots 118 are formed in the frame 50 which are arranged to receive a shaft 120 on which the eccentric 54 is fixed. The shaft 120 is mounted in bearings 122 and a driving gear 124 is fixed on the shaft. A belt 126 passes from the pulley 124 to a pulley 128 mounted on the shaft 130 of an electrically driven motor 132.

The vibrating devices illustrated in the drawings are arranged to give a vertical vibration to the hammers to strike the top of the form. Other vibrating hammers may be provided which may impart vibration to the bottom or sides of the form. It has been found that different forms of vibration vary the nature of the tiles and the character of the coloring effect which may be obtained. It has been found moreover, that the rate of vibration and the manner in which the different rates of vibration are imparted has a very marked effect upon the product; that is, at vibrations from 3,000 to 8,000 impulses per minute very remarkable effects as to coloring and density have been produced. In the manufacture of the ordinary forms of tiles however the rates of vibration varying from 75 to 2,000 impulses per minute have been found to be very satisfactory. The higher rates of vibration tend to compact the material and give very hard, fine grained blocks. The vibration furthermore, tends to bring the larger particles and those particles of the lowest gravity to the top of the form.

The present method may be carried out with any mixture of concrete or other cementitious material and the amount of the various ingredients and the proportion of the water will ordinarily depend upon the type of structure which is being constructed. The proper mixture for any particular purpose can be readily determined by one skilled in the art, but when the present method is employed one may use a substantially lower proportion of water than that customary with the methods of the prior art.

The beneficial results and improved characteristics in the concrete may be secured by the practice of the present methods without necessarily employing all of the detailed features or steps of the method. High frequency vibrations within the range specified above are capable of increasing the solidity of the concrete, eliminating the air and voids and effecting a substantially perfect bond between the elements of the aggregate. The high frequency vibrations also permit a very substantial saving in cement and produce a very high quality product having a greater strength than the products which have not been subjected to the present method and practically any mixture of aggregate, cement and water may be caused to flow into position in the mold without the necessity for using excess water and without the necessity for tamping, spading or other hand methods of distribution and compacting of the green concrete. When the green concrete is subjected to high frequency vibrations a phenomen similar in appearance to the boiling of water appears to take place and the elimination of the air from the concrete is evident from the appearance of a large number of small bubbles at the free surface of the concrete during vibration.

One important feature of the invention consists in the use of different colors of cementitious materials in order to get the desired coloring effects for the finished tiles. This coloring effect is obtained by mixing an individual cementitious material for each color and carefully regulating the specific gravity of the cement, the water consistency of the cement, the order of the distribution of the different colors of layers in the form, and the nature of vibration imparted to the form containing the cement layers. A hopper is provided for each cement of each color and each one of the cements of the various colors is deposited in a layer in the form in which the tile is to be made. The cement having the lightest specific gravity is preferably deposited in the bottom of the form and the cement of the heaviest specific gravity is preferably deposited on the top layer in the form. Different kinds of coloring effects may be obtained by reversing the order of the specific gravities of the cement layers from that described above and by other orders of arrangements of the cement layers. The vibration imparted to the cement by the hammers travels through the cementitious materials in a radial path. The cementitious material of the lowest specific gravity follows a generally upward path and the cementitious material of the highest specific gravity moves in a generally downward path. If the vibration is continued for a sufficient length of time, substantially all of the heavy cement may be moved to the bottom of the form, and substantially all of the lightest cement may be moved to the top of the form. It will be apparent therefore that if the material is deposited in uniform layers and each form is vibrated at substantially the same rate and for the same period of time, the color designs and figurations of the tile will be substantially uniform. That is, the designs will not agree in contour, but the general appearance and color effects will be substantially uniform so that they may be used in building up a floor or side wall and give a very pleasing and uniform appearance. Other coloring effects may be obtained by varying the density or water consistency of the layers and by building the layers partly of wet cement and partly of dry cement.

In carrying out the preferred form of the invention all of the cements of the various different colors are preferably made up with one cementitious base, that is a base of Portland cement, of lime, magnesite, or magnesium oxide. In making some very satisfactory tiles a series of different cements have been made, each having a different color which consists of substantially 50% magnesium oxide and the remainder being rock fillers of different colors and different specific gravities. In case it is intended to impart great hardness and have a product of high density, a retarder is used with the cements to retard the setting and assist the movement of the different color layers of cements through one another.

In the drawings four feed hoppers and four vibrators have been illustrated. It is obvious that the number of hoppers and the vibrators may be varied in accordance with the colors to be desired. The apparatus operates continuously and can be made entirely automatic if desired.

The preferred form of the invention having been thus described what is claimed as new is:

1. A method of forming tiles having decorative surface designs, comprising arranging a series of layers of plastic cements of different colors in a form and forcing portions of the cements from the different layers to penetrate through one another to the bottom of the tile while in a soft plastic condition by imparting rapid vibration to the form carrying the cements.

2. A method of forming tile having decorative surface designs comprising arranging a series of layers of plastic cement containing rock fillers of different characters and substantial proportions of magnesium oxide in a form and forcing the cements of portions of the different layers to penetrate through one another to the bottom of the form while in a plastic condition by imparting rapid vibration thereto.

3. A method of forming tiles comprising arranging a series of layers of plastic cements of different specific gravities in a form, the cement of the lowest specific gravity being placed in the bottom of the form, and the layers of the heavier specific gravities being placed in remote position from the bottom of the form in the order of their specific gravities, and forcing the cements of different layers to penetrate through one another while in a plastic condition by imparting rapid vibration thereto.

4. A method of forming tiles comprising arranging a series of layers of plastic cements, containing substantial proportions of magnesium oxide mixed with rock fillers of different specific gravities and colors, in a form, the layers of the heaviest specific gravities being placed most remote from the bottom of the form, and causing the cement of the different layers to penetrate through one another while in a plastic condition by imparting a rapid vibration thereto.

5. A method of forming tiles comprising arranging a series of bodies of plastic cements of different specific gravities and colors in a form, forcing the cements from the different bodies to penetrate through one another while in a plastic condition by imparting a rapid vibration thereto, and varying the character of the design and the extent of the penetration of the layers by the control of the vibration.

6. A method of forming tiles comprising arranging a series of bodies of plastic cements of different specific gravities and colors in a form, forcing the cements from the different bodies to penetrate through one another while in a plastic condition by imparting a rapid vibration thereto, and varying the character of the design and coloring effect of the finished tiles by varying the arrangement of the bodies in the form before starting the vibration of the tile.

7. A method of forming tiles comprising arranging a series of bodies of plastic cements of different specific gravities and colors in a form, forcing the cements from the different bodies to penetrate through one another while in a plastic condition by imparting a rapid vibration thereto, and varying the character of the design and coloring effect of the tile by varying the water consistency of the cement bodies.

8. A method of forming tiles comprising placing the plastic cement in a form and compacting the cement and controlling the set thereof by successively imparting different vibrations for substantial periods of time, the vibration of each succeeding period increasing in the rate of vibration.

9. A method of forming tiles comprising placing plastic cement in a form, continuously advancing and simultaneously imparting vibration to the form, and increasing the rate of vibration as the form advances.

10. A method of forming tiles comprising arranging a series of layers of cement while in plastic condition and of different specific gravities and colors in a form, continuously advancing the form while vibrating it and controlling the vibrations to impart an increasing speed of vibration as the form advances.

11. A method of forming tiles comprising continuously advancing a form under containers of cement of different gravities and colors, passing successive layers of substantially uniform thickness from the containers to the forms as the forms advance, vibrating the forms after the layers have been deposited therein, and varying the speed of vibration of the forms as they advance.

12. A method of forming tiles comprising continuously advancing a form under containers of cement of different gravities and colors, passing successive layers of substantially uniform thickness from the containers to the forms as the forms advance, vibrating the forms after the layers have been deposited therein, and controlling the feed and distribution of cements into the forms by vibration of the cement containers.

13. A method of making tiles comprising arranging a series of bodies of plastic cements, each body containing approximately 50% of magnesium oxide and rock fillers, each body having a different rock filler and a different color, the bodies of the highest specific gravity being placed most remote from the bottom of the form, and forcing the bodies to penetrate through one another by imparting a series of vibrations to the form and increasing the rate of vibration of the succeeding vibrations.

14. An apparatus for forming tile comprising a conveyor, a series of separate hoppers mounted above the conveyor, a distributing apron for each hopper arranged to pass a sheet of plastic material from each hopper into forms movable with the conveyor, and a series of vibrators mounted adjacent the conveyor and arranged to vibrate the forms on the conveyor as they advance therewith.

15. An apparatus for forming tiles comprising a conveyor, a series of separate hoppers mounted above the conveyor, a distributing apron for each hopper arranged to pass a sheet of plastic material from the hopper upon forms movable with the conveyor, a series of vibrators mounted adjacent the conveyor having members arranged to engage the forms on the conveyor, and means to operate said vibrators at different rates of vibration.

16. An apparatus for forming tile comprising a conveyor, a series of separate hoppers mounted above the conveyor, a distributing apron for each hopper arranged to pass a sheet of plastic material from each hopper upon forms movable with the conveyor, a series of vibrators mounted adjacent the conveyor having members arranged to engage the forms on the conveyor, and means to operate said vibrators at different rates of vibration, the rates of vibration increasing in the direction of the advance of the conveyor.

17. An apparatus for forming tile comprising a conveyor, a series of hoppers mounted above the conveyor, a distributing apron for each hopper, means to vibrate the hoppers to distribute plastic material over the aprons, forms movable with the conveyor under the aprons, and a series of vibrators mounted adjacent the conveyor and arranged to vibrate forms on the conveyor.

18. An apparatus for forming tile comprising a conveyor, a series of separate hoppers mounted above the conveyor, a distributing apron for each hopper, means to vibrate the hoppers and aprons to distribute plastic material over the aprons, a doctor for controlling the thickness of the material moving over the aprons, and a series of vibrators mounted adjacent said conveyor arranged to vibrate forms thereon.

19. An apparatus for forming tiles comprising a track for forms, a conveyor movably adjacent the track for advancing forms thereon, a series of hoppers mounted over said track, each hopper having an apron of approximately the width of the form, means to feed a sheet of plastic material from said hoppers to the forms and a series of vibrators mounted adjacent the track in the rear of the said hoppers and arranged to engage the form on the track and means for operating the vibrator and conveyor.

20. A method of forming tiles having decorative surface designs comprising arranging a series of layers of cements of different colors containing a binder and a filler in a form, forcing portions of the cement from the different layers to penetrate through one another to the bottom of the form by imparting a vibration to the form, and treating the formed tiles to harden the cement.

21. A method of forming tiles having decorative surface designs comprising arranging a series of layers of cements of different colors in a form, said cements containing a binder and filling material of different colors, forcing portions of the different colored cements to penetrate through one another to the base of the tile in the form by imparting rapid vibration of the form and then treating the formed tile to harden the cement.

22. In an apparatus for placing concrete or the like, the combination of a supporting member for the concrete, having an inclined surface engaging and supporting the concrete, with a mass of plastic concrete on said surface and means for maintaining said concrete in a state of high frequency vibration whereby the concrete is caused to flow by gravity down said inclined surface.

23. In an apparatus for placing concrete or the like, a container for the concrete having a restricted discharge opening and having a tapered formation leading to said discharge opening with a high frequency vibrator for producing high frequency vibrations in said container whereby said concrete or the like is reduced to a flowing condition and discharged through said restricted opening.

24. In an apparatus for placing concrete or the like, a container for the concrete having a restricted discharge opening and having a tapered formation leading to said discharge opening with a high frequency vibrator for producing high frequency vibrations in said container whereby said concrete or the like is reduced to a flowing condition and discharged through said restricted opening, and means for varying the size of said restricted discharge opening to control the amount of discharge of concrete or the like.

25. The method of transporting plastic concrete or the like which comprises placing the concrete on an inclined surface of a conveying member, subjecting the member to high frequency vibrations, to place the concrete in a condition of vibration and thereby cause the concrete to progress along the inclined surface from one point to another by gravity.

26. The method of molding cementitious material comprising, placing a plastic cementitious material in a form, subjecting the form to high frequency vibrations, within the range of from 3,000 to 8,000 vibrations per minute, to increase the density of the concrete, increase the strength of the concrete, improve the exterior finish and the uniformity of quality throughout the concrete and to cause the aggregate of the mixture to move into a predetermined position in the form, and causing the mixture to set with the mixture in the condition resulting from said high frequency vibrations.

27. The method of treatment of cementitious material comprising placing a cementitious mixture in a form of predetermined shape, subjecting the cementitious mixture to a continuous train of mechanical vibrations within the range of from 3,000 to 8,000 vibrations per minute, to maintain the particles of the mixture in a state of continuous motion to cause the cementitious mixture to flow into predetermined position in all parts of the form and to cause the particles of the mixture to move into closer engagement with each other to eliminate voids and air spaces and increase the density and strength of the product, and permitting the mixture to set in the condition resulting from said high frequency vibrations.

28. The method of making cementitious articles comprising depositing in forms, plastic cementitious material comprising a cementitious base, aggregate and water mixed to a plastic state, imparting high frequency vibrations within the range of from 3,000 to 8,000 vibrations per minute, to the forms to cause the parts of the plastic cementitious materials to move with respect to each other to compact the material in the form and improve the strength, hardness, and grain of the product, and causing the mixture to set in the condition resulting from said high frequency vibrations.

In witness whereof, I hereunto subscribe my name this 8 day of September, 1931.

EDWIN H. WHITE.